Dec. 4, 1934.  F. E. WOLCOTT  1,983,212
COFFEE MAKER
Filed July 29, 1932  2 Sheets-Sheet 1

INVENTOR
FRANK E. WOLCOTT

BY
ATTORNEY.

Dec. 4, 1934.     F. E. WOLCOTT     1,983,212
COFFEE MAKER
Filed July 29, 1932     2 Sheets-Sheet 2

INVENTOR
FRANK E. WOLCOTT

BY
ATTORNEY.

Patented Dec. 4, 1934

1,983,212

UNITED STATES PATENT OFFICE 1,983,212

COFFEE MAKER

Frank E. Wolcott, West Hartford, Conn., assignor to The Silex Company, a corporation of Connecticut Application July 29, 1932, Serial No. 626,003

31 Claims. (Cl. 219—43)

My invention relates to coffee makers.

It has for its object to provide an improved electric coffee maker of the automatic quick cooling vacuum type. A further object is to provide an improved stove for such a coffee maker, which, while retaining the improved quick heating and quick cooling features required in such a stove, is of a simplified and inexpensive construction. A still further object is to provide such a stove wherein it is possible to eliminate the relatively expensive lower bowl supporting prongs heretofore provided in such quick cooling devices, and to provide instead of the same a simple bowl supporting metal rim or ring of relatively inexpensive construction. Another object of my invention is to provide an improved construction having the above advantages and wherein it is made possible to utilize a relatively inexpensive unit of the refractory type, and through an improved construction and arrangement of the parts and co-operating air circulating means, still obtain the desired quick heating and cooling required in such a coffee maker. Still further objects are to provide an improved and simplified supporting structure for the bowl and unit wherein both of the latter may be carried on the same supporting member, and where.n the latter may be supported on a table or the like while being effectually insulated therefrom, and also to provide an improved heating unit and improved means for maintaining an effective flow of air relative to the unit rim, and the bowl during the heating and cooling operations of the latter. These and other objects and advantages of my improved construction will, however, hereinafter more fully appear.

In the accompanying drawings I have shown for purposes of illustration one embodiment wh'ch my invention may assume in practice.

In these drawings,—

Figure 1:
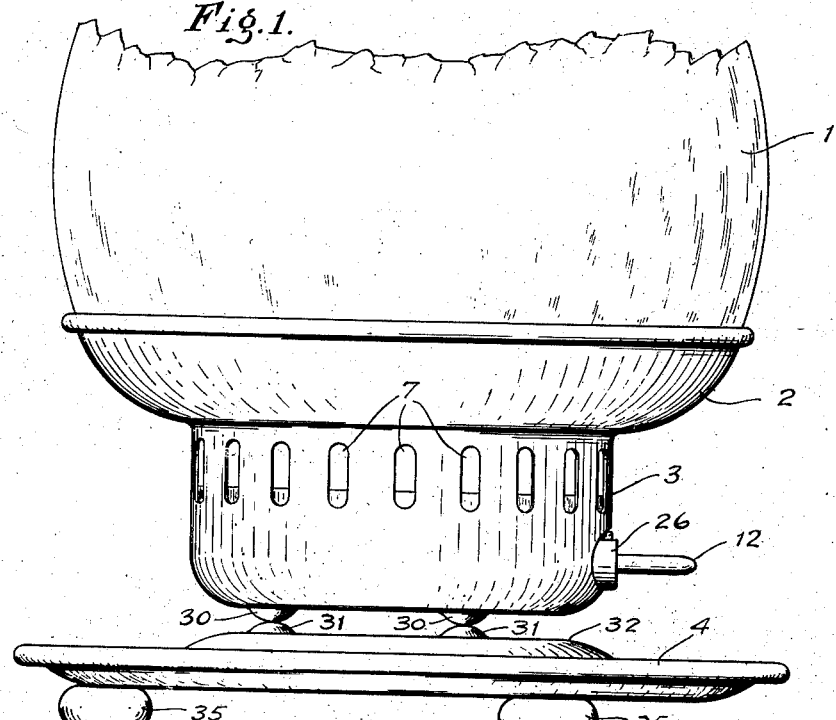
Figure 1 is a side elevation of this form of my improved stove with a portion of the lower bowl of a vacuum type coffee maker supported thereon, the remainder of the coffee maker being broken away to facilitate illustration.
Figure 2:
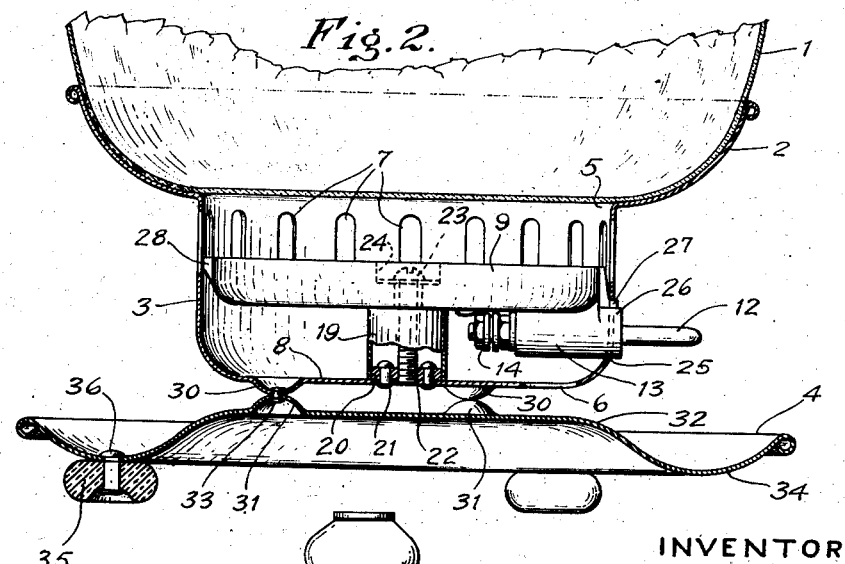
Fig. 2 is a central vertical sectional view through the stove and the lower portion of the bowl, but with the heating unit shown in side elevation.
Figure 2A:
Fig. 2a is a reduced side elevation of a complete coffee maker of my improved construction.
Figure 3:
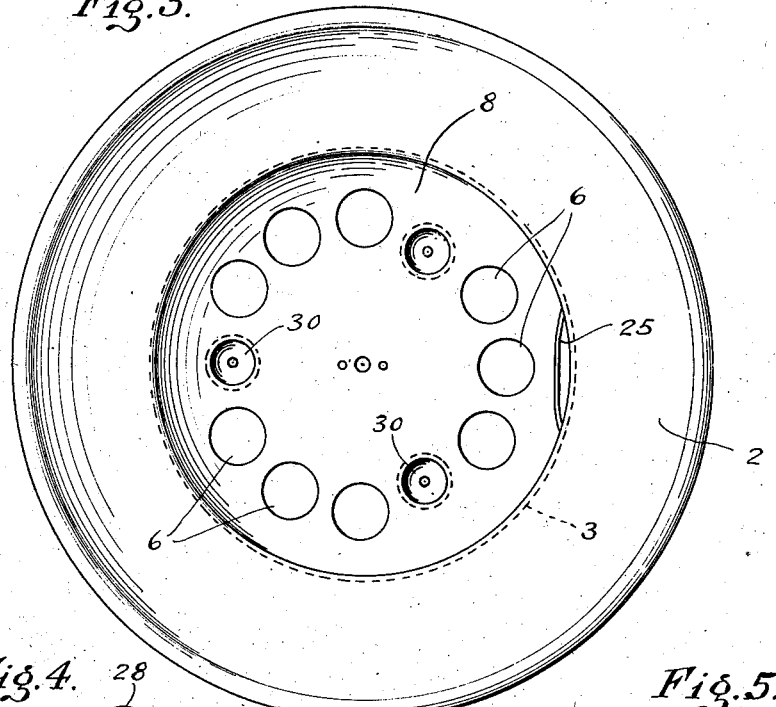
Fig. 3 is a top plan view of the bowl supporting and heater unit housing member, the heating unit and its connections being removed to facilitate illustration.
Figure 4:
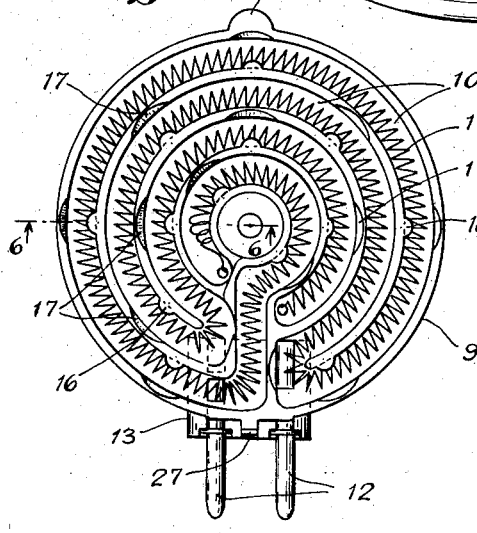
Fig. 4 is a top plan view of the heater unit.
Figure 5:
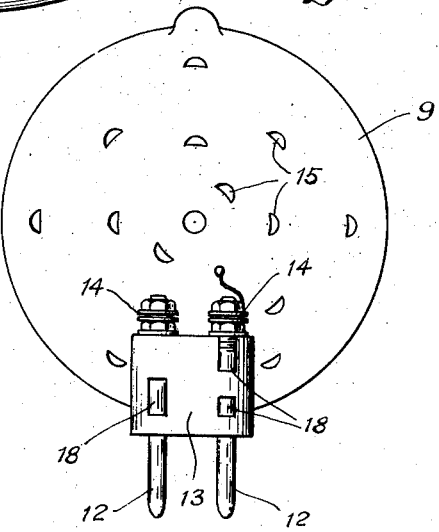
Fig. 5 is a bottom plan view of the latter.
Figure 6:
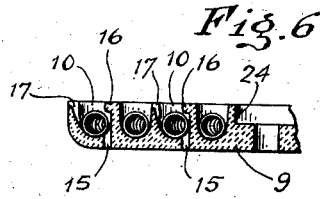
Fig. 6 is a detail sectional view on line 6—6 of Figure 4.

In this illustrative construction I have shown in Figure 2a an entire electrically heated automatic quick cooling vacuum type coffee maker, generally indicated at A, and comprising the usual operatively connected upper and lower bowls mounted on an improved stove cooperating therew.th. Also, in Figure 1, I have, for simplicity of illustration, shown only a portion of the lower bowl 1 of such a coffee maker supported on the stove, with the bottom of the bowl 1 resting in a supporting rim 2 on the stove and disposed above a heating unit housing or carrying member 3, while the latter is, in turn, supported on a base member or tray 4.

Referring more particularly to the stove, it will be noted that the rim 2 and heater unit carrying member 3 are herein in the form of a single unit and also, as in a preferred construction, formed from a single sheet of metal, with the rim 2 of substantially larger diameter than the member 3 and in the form of a concave, open, peripheral extension thereon. Moreover, it will be noted that this rim is shaped to conform to the shape of the bottom of the bowl 1 and that it fits the bottom thereof, all in such manner as to support the bowl securely in a vertical position while requiring only a relatively shallow rim extending only a short distance above the bottom of the bowl. As shown herein, the member 3 is of substantially cylindrical cross section and open at the top and communicates freely with the bowl bottom, herein indicated at 5, through its open top. Herein, it also is provided with a series of air openings 6 around its bottom which are adapted to permit a substantial flow of air up through the bottom of the member 3. Further, the latter is herein also provided in its sides and just below the rim 2 with another series of air apertures 7 adapted to permit a free flow of the air, which enters through the openings 6, out laterally through these openings 7 below the bowl bottom 5 and the rim 2. Herein, the bottom air openings 6 are in the form of a series of round holes formed in a flat bottom 8 of the member 3 and spaced from the axis of the latter and also from the side walls of the same, while the openings 7 are in the form of a series of slots spaced around the top of the member 3. It will, however, be evident that both these openings 6 and 7 may obviously assume widely different forms, the openings 7, for example, being readily embodied in a decorative form, as distinguished from the utilitarian slots illustrated herein.

Operatively mounted in the member 3 is my improved heating unit. The latter herein includes a shallow light weight base 9 of refractory material, such as porcelain, and which is adapted to be quickly heated and cooled, and herein in the form of a disc of but slightly smaller diameter than the cross section of the housing 3. As shown this base 9 also has in the upper surface thereof a series of connected grooves 10 in which a usual form of helical resistance wire 11 is disposed, while the ends are connected on the under side of the member 9 to terminal plugs 12. Herein, these plugs 12 are carried in a depending projection or housing 13 formed of the same material as the member 9 and integral with and on the bottom of the latter, and the resistance coil 11 is connected to terminals 14 for the plugs which are located between this projection 13 and the axis of the unit and spaced from the latter. As shown, the portion 9 of the unit is slightly smaller in diameter than the internal diameter of the member 3, in such manner as to permit the free passage of air up around the outside of the member 9 and inside the member 3. Further, it will be noted that the member 9 is provided with a series of apertures 15 in its bottom and communicating with the bottoms of the grooves 10 therein, in such manner as to permit the passage of air through the member 9 and through the coiled resistance wire 11 seated in the grooves. As shown herein, retaining lugs 16 for the resistance wire 11, are also disposed opposite cut away portions 17 in the walls of the grooves 10, and the openings 15 open upward into the grooves under these lugs 16. Further, it will be noted that the terminal carrying member 13 is provided with apertures 18 in its bottom exposing the plugs 12 extending therethrough.

This improved unit is herein mounted in an improved manner in the member 3. As shown, it is so disposed in the latter that the top of the unit is spaced from the top of the member 3 by substantially the same distance that the bottom of the unit is spaced from the bottom 8 of the member 3. Herein, the unit is supported in this position on a hollow cylindrical member 19, preferably of insulating material, forming a supporting and spacing member therefor, and, in turn, surrounding a smaller disc-like member or washer 20 riveted or otherwise suitably secured at 21 to the bottom 8 and having a threaded axial aperture 22. In this aperture is also threaded a unit holding screw 23, the head of which is suitably seated in a wider and deeper axial countersink 24 in the upper surface of the member 9. It will further be noted that the member 3 is suitably cut away, as in the form of an oval aperture shown at 25, to permit the terminal plugs 12 on the unit and an adjacent portion 26 on the portion 13, to be projected therethrough. As shown herein, a projection 27 is also provided on the front end 26 of the portion 13, and engages the upper edge of the opening 25 and a lateral projection 28 is provided on the periphery of the member 9 diametrically opposite the projection 27, in such manner that when the screw 23 is tightened in the position illustrated in Figure 2, the unit is both definitely located and held in position, while providing for a freeflow of air upward between substantially the entire periphery of the same and the inner wall of the member 3.

As regards the support of the member 3, it will be noted that I have herein shown the same carried on a tray 4 and connected thereto and supported thereon by means adapted to facilitate the flow of air and to minimize the transmission of heat to this tray. As shown, these means are in the form of a series of conical depressions 30, herein three, in the bottom 8 of the member 3 and spaced between the air apertures 6, and corresponding conical raised supporting portions 31 for the portions 30 formed on a raised central portion 32 on the tray 4, while rivets 33 inside these portions 30, 31 connect the same and thus unite the member 3 and the tray 4 into a unitary structure. Further, it will be noted that the rim portion 34 of the tray is mounted on a series of insulating feet 35 suitably connected thereto by rivets or screws 36.

In the use of my improved stove, it will be evident that when a coffee maker, with its lower bowl 1 filled with water, and its upper bowl (not shown) supplied with coffee, is placed on the stove, it will be definitely positioned thereon in the rim 2. When the terminal plugs 12 are connected to a source of current supply, it will further be evident that the unit including the member 9 and resistance 11, will be brought very quickly to a high temperature in such manner that the heat will rise therefrom and act effectively upon the bottom of the bowl 1 supported in the rim 2. As the unit is heated, it will further be evident that air will flow through the openings 6 in the bottom 8 of the member 3, and up around and through the member 9 and heating coil 11 in such manner as to be heated by the latter. Attention is also directed to the fact that the heated air rising from the heating unit, being unable to pass vertically through the rim 2 because of the presence of the bowl 1, will be forced out laterally through the lateral openings or slots 7 in the top of the member 3. Thus, the bottom of the bowl 1 and the portion of the latter supported in the rim 2 being effectively heated, the water in the bottom bowl 1 will be heated and accordingly pass into the upper bowl in a usual manner to act upon the coffee therein. While, as usual in such coffee makers, the water will remain in the upper bowl so long as heat is supplied to the lower bowl, and will return to the lower bowl when the latter is permitted to cool, it will be noted that in my improved construction, when the current flow to the unit is interrupted, the latter will also cool very quickly. More particularly, it will be observed that during the cooling operation, an induced flow of cooling air will be established through the openings 6 and through and around the unit 9 and out through the openings 7 in the top of the member 3. Further, it will be noted that the unit 9 is herein of such a construction and so disposed relative to the bowl and member 3 as to cause it to be cooled very quickly by this air flow and as distinguished from acting as a heat storage reservoir in the manner usual to a heater of the refractory type. Thus, in my improved construction, it is possible not only for the water to be heated very quickly, but for the coffee maker to remain upon the stove and yet to have the brewed coffee automatically return from the upper to the lower or dispensing bowl very quickly and in the desired predetermined time, i. e. within the limits of a normal infusion period, after the flow of current to the unit 9 has been interrupted.

As a result of my improved construction, it will be noted that it is made possible to utilize a sheet material supporting rim for the bowl 1, as distinguished from special spaced and more expensive supporting fingers, without bowl breakage and while still utilizing the quick heating and cooling previously thought only to be obtainable by the use of such fingers. Further, it will be noted that it is possible to utilize a heating unit of refractory type while still obtaining the desired quick heating and cooling. Attention is moreover directed to the exceedingly inexpensive construction which is provided, and wherein the members 2 and 3 are formed from a single piece of sheet metal, the tray 4 is formed from another single piece of sheet metal, and the unit is of simple and inexpensive type, while the parts are also connected and mounted in an exceedingly simple and inexpensive manner. It will also be observed that the structure is such that the heat transmitted from the unit downward is minimized, not only due to the mounting of the unit in the bottom of the member 3, but also due to the mounting of the latter on the portion 32 of the tray 4, and to the spacing of that portion from the table or the like on which the tray is supported. These and other advantages of my improved construction will, however, be clearly apparent to those skilled in the art.

While I have in this application specifically described one embodiment which my invention may assume in practice, it will be understood that the same is shown for purposes of illustration, and that the invention may be modified and embodied in various other forms without departing from its spirit or the scope of the appended claims.

What I claim as new and desire to secure by Letters Patent is:—

1. In combination with a vacuum type coffee maker having operatively connected upper and lower bowls, a support having a rim supporting the lower bowl thereof, electric heating means in said support spaced below said rim and also out of contact with said bowl, and means for providing upon cessation of current flow a quick cooling air flow above said heating means and laterally therefrom to the atmosphere beneath said rim while said bowl is thereon.

2. In combination with a vacuum type coffee maker having operatively connected upper and lower bowls a support having a rim supporting the lower bowl thereof, quick cooling electric heating means in said support spaced below said rim and out of contact with said bowl, and air passage means for providing an induced quick cooling flow of air through said support and laterally therein to the atmosphere beneath said rim while said bowl is thereon.

3. In combination, a bowl, a bowl supporting rim fitting the bottom of said bowl, electric heating means spaced below said bowl bottom out of contact with said bowl, and air supply means for supplying on cessation of current flow to said heating means, an induced flow of cooling air around the exterior of said heating means and therefrom laterally to the atmosphere below said bowl and rim while said bowl is on the latter.

4. In combination with a bowl, a support having an axial opening exposing the bottom of said bowl and a peripheral rim surrounding the same and supporting said bowl thereon, electric heating means in said support spaced below said rim coaxially with said opening, and means providing air circulation through said support upon the exposed bottom of said bowl and laterally to the atmosphere above said heating means and beneath said rim.

5. In a coffee maker stove, an annular bowl rim having an axial opening exposing the bowl bottom, electric heating means disposed coaxially with said opening and spaced below said rim, and a support carrying said rim and heating means having air inlet means in its bottom, communicating air passage means extending up through said support and delivering on the exposed bowl bottom, and lateral outlet passage means communicating freely with the space above said heating means and laterally with the atmosphere below said rim.

6. A coffee maker stove having a bowl supporting rim on its top adapted to receive a bowl to be heated and cooled, electric heating means spaced below and axially of said rim out of contact with a bowl on the latter, and air passage means leading up around said heating means and laterally therefrom to the atmosphere above said heating means and below said rim.

7. A coffee maker stove having a bowl supporting rim on its top adapted to receive a bowl to be heated and cooled, electric heating means spaced below and axially of said rim out of contact with a bowl on the latter, and a casing enclosing said heating means and having air passage means therein above said heating means and below said rim and communicating freely laterally with the atmosphere while a bowl is on said rim.

8. A coffee maker stove having a bowl support on its top and a heater housing surrounding the axis of said support, a quick cooling refractory electric heating unit of substantially the diameter of said housing in said housing spaced out of contact with a bowl on said support and above the bottom of the housing, and air passage means in the bottom of said housing and communicating with the space above said heating unit and laterally with the atmosphere below said support while a bowl is thereon.

9. A coffee maker stove having a quick cooling flange forming a bowl support on its top and a heater housing surrounding the axis of said support below said support, a quick cooling electric heating means in said housing spaced out of contact with a bowl on said support, and air flow inducing passage means in the bottom of said housing and also nearer the top thereof below said flange communicating with the space above said heating means and laterally with the atmosphere below said support while a bowl is thereon.

10. A coffee maker stove having a bowl support on its top and a heater housing surrounding the axis of said support, a shallow refractory disc carrying electric heating means in said housing spaced below and out of contact with a bowl on said support and spaced above the bottom of said housing, and air passage means in the bottom of said housing and in the top thereof communicating with the space above said heating means and laterally with the atmosphere below said support while a bowl is thereon.

11. A coffee maker stove having a bowl supporting rim on its top and a heater housing surrounding the axis of said rim, a quick cooling refractory electric heating unit spaced in said housing below the top thereof, means in said housing spacing said unit substantially above the housing bottom, and air passage means in the bottom of said housing and in the sides thereof communicating with the space above said unit and laterally with the atmosphere below said rim.

12. A coffee maker stove having a bowl support on its top, a heater housing surrounding the axis of said support below the latter, a quick cooling refractory electric heating disc in said housing of substantially the same diameter as said housing and spaced below said support in adjacency to and out of contact with a bowl thereon, and co-operating means for effecting quick cooling of said disc upon cessation of current flow therethrough and while a bowl is on said support.

13. A coffee maker stove having a bowl support on its top, a heater housing surrounding the axis of said support below the latter, a quick cooling refractory electric heating disc in said housing spaced below said support in adjacency to and out of contact with a bowl thereon, and co-operating means for effecting quick cooling of said disc upon cessation of current flow therethrough and while a bowl is on said support comprising air passages leading through said housing and communicating with the atmosphere below said disc and freely laterally with the atmosphere beneath a bowl on said support and above said disc.

14. A coffee maker stove having a bowl support on its top, a heater housing surrounding the axis of said support below the latter, a shallow refractory heater support in said housing spaced below said bowl support in adjacency to and out of contact with a bowl thereon, electric heating means distributed over the upper surface of said heater support, and co-operating means for effecting quick cooling of said heater support upon cessation of current flow and while a bowl is on said bowl support.

15. A coffee maker stove having a bowl support on its top, a heater housing surrounding the axis of said support below the latter, a shallow refractory heater support in said housing spaced below said bowl support in adjacency to and out of contact with a bowl thereon, electric heating means distributed over the upper surface of said heater support, and co-operating means for effecting quick cooling of said heater support upon cessation of current flow and while a bowl is on said bowl support comprising a plurality of apertures distributed over said refractory heater support leading therethrough, and co-operating air passages leading up through said housing and communicating freely laterally with the atmosphere above said heater support and beneath a bowl on said bowl support.

16. A coffee maker stove having a bowl support on its top and a heater housing surrounding the axis of said support, a quick cooling refractory electric heating unit spaced in said housing below said support, means in said housing spacing said unit substantially above the housing bottom, air passage means through and around said unit, and air passage means through the housing bottom and in the sides thereof communicating with the space above said unit and laterally with the atmosphere beneath said support.

17. In a coffee maker stove, a bowl support having an axial housing below the inner periphery thereof, electric heating means disposed in said housing spaced substantially below the bottom of a bowl supported on said support and comprising a shallow refractory disc and electric heating means thereon, and air circulating means through said housing and communicating laterally with the atmosphere below said support while a bowl is thereon for effecting quick cooling of said bowl upon cessation of current flow.

18. In a coffee maker stove, a body comprising a heater housing having an annular bowl supporting rim on the top thereof, electric heating means in said housing spaced below said rim, and air circulating means having air inlet means leading into said housing below said unit and air outlet means above said unit and communicating laterally with the atmosphere beneath said rim while a bowl is thereon.

19. In a coffee maker stove, a body comprising a heater housing having an annular bowl supporting rim on the top thereof, electric heating means in said housing spaced below said rim, a base below said housing, co-operating projections on the bottom of said housing and the top of said base providing air passage means therebetween, and communicating air passage means in the bottom of said housing and in the top thereof communicating laterally with the atmosphere below said rim while a bowl is thereon.

20. In a coffee maker stove, a body comprising a heater housing having an annular bowl supporting rim on the top thereof, electric heating means in said housing spaced below said rim comprising a shallow quick cooling refractory disc having a resistance element housed in the upper surface thereof, spacing means spacing the bottom of said disc from the bottom of said housing, and air circulating passage means in the bottom of said housing and in the top thereof communicating laterally with the atmosphere below said rim.

21. In an electric stove for coffee makers, a casing, a shallow refractory disc spaced substantially below the top thereof and having a grooved top, resistance means disposed in said grooved top, and means in the bottom of said casing spacing said disc substantially above the bottom of said casing.

22. In an electric stove for coffee makers, a casing, a shallow refractory disc spaced substantially below the top thereof and having a grooved top, resistance means disposed in said grooved top, means in the bottom of said casing spacing said disc substantially above the bottom of said casing, and air passage means through said disc and around the same having inlet means in the bottom of said casing and lateral outlet means in the top thereof communicating with space above said disc.

23. A heating unit comprising a shallow refractory disc having a grooved top and electric resistance means exposed in the grooves in said grooved top, said refractory disc being of substantially the same depth as the depth of the grooves therein and having a series of air passage means therein leading from the bottom of said disc into said grooves.

24. A heating unit comprising a shallow refractory disc having a grooved top and a depending and laterally projecting terminal carrying portion forming a part of said disc, resistance means disposed in said grooved top, terminals extending through said depending portion, and connections between said resistance means and terminals disposed beneath said disc and on the opposite side of said depending portion from the projecting ends of said terminals.

25. A heating unit comprising a shallow refractory disc having a grooved top and a depending and laterally projecting terminal carrying portion forming a part of said disc, resistance means exposed in the grooves in said grooved top, terminals extending through said depending portion, connections between said resistance means and terminals disposed beneath said disc and on the opposite side of said depending portion from the projecting ends of said terminals, and air passage means through said disc and depending portion permitting air flow through said resistance means and upon said terminals.

26. In combination with a vacuum type coffee maker having operatively connected upper coffee and lower water bowls, a supporting bowl having a rim supporting the water bowl and an axial chamber of smaller diameter than said rim below the latter, an electric heating unit in said chamber spaced below said rim and out of contact with said water bowl, and means in said supporting bowl for automatically effecting the return to said water bowl of the brewed coffee in said coffee bowl upon the completion of a normal infusion following cessation of current flow to said unit including air passage forming means in the bottom of said chamber and lateral air passage forming means in the top thereof below said rim and communicating laterally with said unit and through said chamber with said bottom air passage forming means.

27. In combination with a vacuum type coffee maker having operatively connected upper coffee and lower water bowls, a supporting bowl having a rim supporting the water bowl and an axial chamber of smaller diameter than said rim below the latter, an electric heating unit in said chamber spaced below said rim and out of contact with said water bowl, and means in said supporting bowl for automatically effecting the return to said water bowl of the brewed coffee in said coffee bowl upon the completion of a normal infusion following cessation of current flow to said unit including air passage forming means in the bottom of said chamber and lateral air passage forming means in the top thereof below said rim and communicating laterally with said unit and through said chamber with said bottom air passage forming means, said unit including a refractory resistance carrying disc of substantially the cross section of said chamber and having air passage means between the periphery of said disc and the inner wall of said chamber.

28. In combination with a vacuum type coffee maker having operatively connected upper coffee and lower water bowls, a supporting bowl having a rim supporting the water bowl and an axial chamber of smaller diameter than said rim below the latter, an electric heating unit in said chamber spaced below said rim and out of contact with said water bowl, means in said supporting bowl for automatically effecting the return to said water bowl of the brewed coffee in said coffee bowl upon the completion of a normal infusion following cessation of current flow to said unit including air passage forming means in the bottom of said chamber and lateral air passage forming means in the top thereof below said rim and communicating laterally with said unit and through said chamber with said bottom air passage forming means, a support beneath the bottom of said supporting bowl, and means between the bottom of said unit and the bottom of said supporting bowl and disposed in the path of air flowing up through said bottom air passage forming means for cutting down the heat supply from said unit to said support.

29. In a coffee maker stove, a supporting and housing bowl having a peripheral coffee maker bowl supporting rim and a coaxial chamber of smaller diameter than said rim extending downward below the latter, an electric heating unit in said chamber spaced below said rim and out of contact with a bowl thereon, lateral air passage forming means in said chamber beneath said rim and communicating laterally with said unit, and cooperating air passage means in said supporting bowl for effecting air flow up inside the latter and relative to said heating unit and out said lateral air passage forming means when a coffee maker bowl is on said rim.

30. In a coffee maker stove, a supporting and housing bowl having a peripheral coffee maker bowl supporting rim and a coaxial chamber of smaller diameter than said rim extending downward below the latter, an electric heating unit in said chamber spaced below said rim and out of contact with a bowl thereon, lateral air passage forming means in said chamber beneath said rim and communicating laterally with said unit, and cooperating air passage means in said supporting bowl for effecting air flow up inside the latter and relative to said heating unit and out said lateral air passage forming means when a coffee maker bowl is on said rim, said heating unit including a refractory disc of substantially the cross section of said chamber and having air passage means between its periphery and the inner wall of said chamber.

31. In a coffee maker stove, a supporting and housing bowl having a peripheral coffee maker bowl supporting rim and a coaxial chamber of smaller diameter than said rim extending downward below the latter, an electric heating unit in said chamber spaced below said rim and out of contact with a bowl thereon, lateral air passage forming means in said chamber beneath said rim and communicating laterally with said unit, cooperating air passage means in said supporting bowl for effecting air flow up inside the latter and relative to said heating unit and out said lateral air passage forming means when a coffee maker bowl is on said rim, a support beneath said first mentioned bowl, and means beneath said unit and disposed in the path of air flowing up through said supporting bowl apertures for reducing the supply of heat from the bottom of said unit to said support.

FRANK E. WOLCOTT.